United States Patent
Spesser

(10) Patent No.: US 10,940,766 B2
(45) Date of Patent: Mar. 9, 2021

(54) COMMUNICATION UNIT FOR A VEHICLE

(71) Applicant: Dr. Ing. h.c. F. Porsche Aktiengesellschaft, Stuttgart (DE)

(72) Inventor: Daniel Spesser, Illingen (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 234 days.

(21) Appl. No.: 16/256,481

(22) Filed: Jan. 24, 2019

(65) Prior Publication Data
US 2019/0225103 A1 Jul. 25, 2019

(30) Foreign Application Priority Data
Jan. 25, 2018 (DE) .......................... 102018101642.5

(51) Int. Cl.
*B60L 53/16* (2019.01)
*B60L 53/62* (2019.01)
(Continued)

(52) U.S. Cl.
CPC ............. *B60L 53/16* (2019.02); *B60L 53/305* (2019.02); *B60L 53/62* (2019.02); *H02J 7/06* (2013.01); *H02J 7/0027* (2013.01)

(58) Field of Classification Search
CPC ... B60L 53/16; B60L 53/62; H02J 7/06; H02J 7/0027
See application file for complete search history.

(56) References Cited

U.S. PATENT DOCUMENTS 9,199,538 B2* 12/2015 Masuda ................ B60L 3/0069
10,168,373 B2* 1/2019 Zaki ...................... G01R 31/54
(Continued)

FOREIGN PATENT DOCUMENTS

DE   102012103208 A1   10/2013
JP   2011024317 A   2/2011
(Continued)

OTHER PUBLICATIONS

Korean Notice of Preliminary Rejection for Korean Application No. 10-2019-0009080, dated Aug. 25, 2020, 4 pages.
(Continued)

*Primary Examiner* — Richard V Muralidar
(74) *Attorney, Agent, or Firm* — RatnerPrestia

(57) ABSTRACT

A communication unit or a vehicle has a control unit, a first connection, a second connection, a first switchable resistance bridge, a second switchable resistance bridge and a measuring apparatus for generating a measurement signal characterizing the voltage at the first resistance bridge. The first switchable resistance bridge and the second switchable resistance bridge are each provided between the first connection and the second connection and are connected in parallel with one another. The control unit has at least one first state and one second state, which first state corresponds to an active charging operation, and which second state occurs when the control unit in the first state receives an external abort signal via the first connection and the second connection. In the event of a change to the second state, the control unit turns off the first switch, turns off the second switch, and turns on the second switch.

12 Claims, 4 Drawing Sheets

(51) Int. Cl.
  *H02J 7/06* (2006.01)
  *H02J 7/00* (2006.01)
  *B60L 53/30* (2019.01)

(56) References Cited

U.S. PATENT DOCUMENTS

| | | |
|---|---|---|
| 2009/0091291 A1 | 4/2009 | Woody et al. |
| 2012/0098490 A1 | 4/2012 | Masuda |
| 2012/0135626 A1 | 5/2012 | Tormey et al. |
| 2013/0088199 A1 | 4/2013 | Matsuno et al. |
| 2013/0088200 A1 | 4/2013 | Kamishima |
| 2015/0022152 A1 | 1/2015 | Nakagawa et al. |
| 2016/0059724 A1 | 3/2016 | Choi |

FOREIGN PATENT DOCUMENTS

| | | | |
|---|---|---|---|
| JP | 2016052246 A | | 4/2016 |
| JP | 2016171613 | * | 9/2016 |
| JP | 2016171613 A | | 9/2016 |

OTHER PUBLICATIONS

"SAE Electric Vehicle Conductive Charge Coupler," Norm SAE IEC J1772, Aug. 2001, with translation, 65 pages.
Japanese Notification of Reason for Rejection for Japanese Application No. 2019-009236, dated Jan. 10, 2020, 4 pages.

* cited by examiner

COMMUNICATION UNIT FOR A VEHICLE

CROSS-REFERENCE TO RELATED APPLICATION

This application claims priority to German Patent Application No. DE 10 2018 101 642.5, filed Jan. 25, 2018, the contents of such application being incorporated by reference herein in their entirety.

FIELD OF THE INVENTION

The invention relates to a communication unit for a vehicle, in particular for an electrically operated vehicle.

BACKGROUND OF THE INVENTION

Modern charging stations communicate with the vehicle to be charged and use signals to interchange information relating to the current state and relating to possible charging parameters.

US 2009/0091291 A1, US 2012/0135626 A1 and US 2015/0022152 A1, all of which are incorporated by reference herein, each disclose an on-board charger for a vehicle, which charger communicates with a charging station in order to make it possible for the charging station to determine if the charging plug is removed during a charging operation.

US 2013/0088199 A1, which is incorporated by reference herein, describes an apparatus which allows an electric vehicle to be disconnected from a charging station during a charging operation and to then be connected again. The charging station detects the respective state.

US 2013/0088200 A1, incorporated by reference herein, describes an on-board charger which temporarily stops the charging operation if it receives a disconnect signal and continues the charging operation if the disconnect signal is dropped.

SUMMARY OF THE INVENTION

According to aspects of the invention, pulling of a plug and subsequent new insertion of the plug are simulated by turning off the second switch and then turning it on again. In some charging stations, this makes it possible to automatically continue the charging operation after an error and therefore increases the probability of the vehicle being charged when the vehicle owner fetches his vehicle. This solution has proved to be advantageous, for example, if older charging stations are combined with newer vehicles. This combination resulted in errors since the older charging stations do not know the new communication protocols and the older charging stations reacted with an error and with a request to insert the charging plug again, which can be carried out automatically by means of the subject matter described herein.

According to one preferred embodiment, the control unit has a filter in order to control the second switch. This reduces the risk of unwanted switching of the second switch since this could result in the charging operation being aborted.

According to one preferred embodiment, the filter is a low-pass filter. This makes it possible to filter out high-frequency or brief interference.

According to one preferred embodiment, the control unit has a microcontroller, which microcontroller is designed to control the second switch. This makes it possible to control the second switch in a program-controlled manner.

According to one preferred embodiment, the communication unit is designed to evaluate the measurement signal in the first state and to classify a change in the duty cycle to 100% as an external abort signal. This is a preferred configuration of the error signal. Alternatively, another duty cycle could also be defined as an error signal.

According to one preferred embodiment, the control unit is designed to carry out the following step between steps b) and c): b1) waiting for a predefined period. This increases the robustness of the method since a check is carried out in order to determine whether the charging station has reacted in accordance with the signal.

According to one preferred embodiment, the control unit is designed to monitor the measurement signal after step b) and, as a necessary condition for the change to step c), to check whether the magnitude of the measurement signal is within a predefined first range. This increases the operational reliability since the process is continued only if the charging station and the control unit react accordingly.

According to one preferred embodiment, the control unit is designed to monitor the measurement signal after step b) and, as a necessary condition for the change to step c), to check whether the measurement signal has a duty cycle of 100%. A check is therefore carried out in order to determine whether the charging station reacts properly.

According to one preferred embodiment, the control unit is designed to check the period after step b) and, when the at least one necessary condition has not been satisfied within a predefined maximum period, to turn off the first switch and to turn on the second switch and to then change to step a) again. The communication is therefore restarted since the reaction does not correspond to the communication protocol.

According to one preferred embodiment, the control unit is designed to carry out the following steps after step c): d) the first switch is turned on, and e) the charging operation is started. As a result, the charging station is firstly notified that the communication unit is ready to start and the charging operation is correctly started by virtue of a signal being transmitted from the control unit to a charging unit, for example.

According to one preferred embodiment, the control unit is designed to monitor the measurement signal after step d) and, as a necessary condition for the change to step e), to check whether the magnitude of the measurement signal for a pulse is within a predefined second range. In the case of a PWM signal having a duty cycle of greater than 0% and less than 100%, a pulse and a pulse pause alternately occur, wherein the entire period duration is at least temporarily constant. The level of the voltage is therefore determined during a pulse and not during a pulse pause.

According to one preferred embodiment, the control unit is designed to monitor the measurement signal after step d) and, as a necessary condition for the change to step e), to check whether the duty cycle of the measurement signal is less than 100%. The presence of a PWM signal having a duty cycle of less than 100% is therefore presupposed in order to change to the next step.

According to one preferred embodiment, the second switch is in the form of a MOSFET, a relay or a transistor. These are preferred switches, wherein the MOSFET is particularly highly suitable as a special transistor since it has a high packing density and low production costs.

According to one preferred embodiment, the control unit is designed to evaluate a PWM signal supplied via the first connection and the second connection.

According to one preferred embodiment, the communication unit is designed to interact with a charging station having a plug according to the EN 62196 Type 2 standard.

BRIEF DESCRIPTION OF THE DRAWINGS

Further details and advantageous developments of the invention emerge from the exemplary embodiments, which are described below, are illustrated in the drawings and should not be understood as meaning a restriction of the invention in any way, and from the subclaims. In the drawings

DETAILED DESCRIPTION OF THE INVENTION

Figure 1:
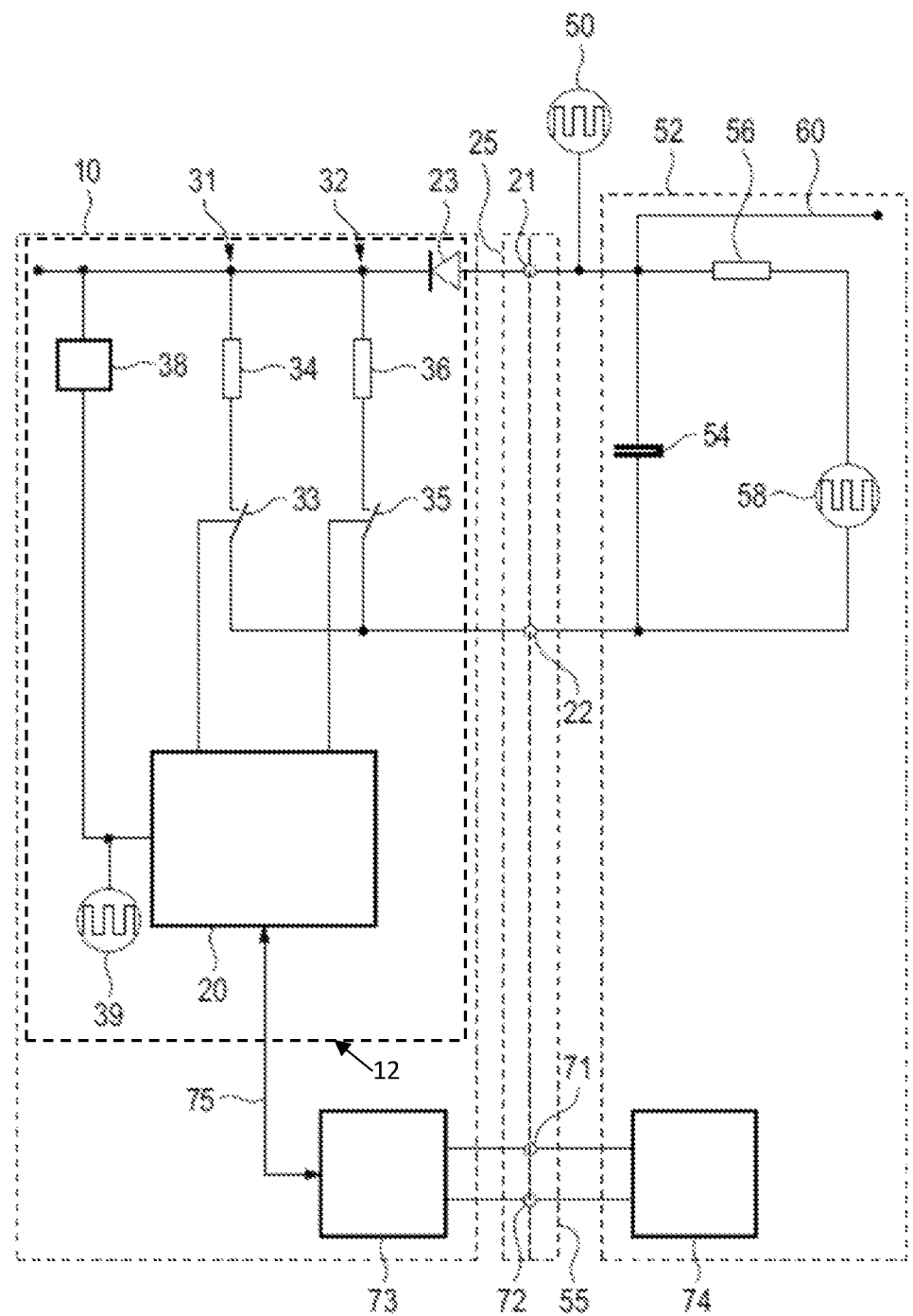
FIG. 1 shows a schematic illustration of a vehicle having a communication unit and of a charging station connected to this vehicle.

FIG. 1 shows a schematic illustration of a vehicle 10 and of a charging station 52. The vehicle 10 is preferably an electrically operated vehicle. The vehicle 10 has a communication unit 12 which is connected to the charging station 52 via a first connection 21 and a second connection 22. A schematically indicated plug 55 is preferably provided for this purpose, which plug is usually fastened to the charging station 52 and can be releasably connected to a corresponding socket 25 of the vehicle 10. The communication unit 12 has a control unit 20, a first switchable resistance bridge 31 and a second switchable resistance bridge 32. The first switchable resistance bridge 31 and the second switchable resistance bridge 32 are each provided between the first connection 21 and the second connection 22 and are connected in parallel with one another. A diode 23 is additionally preferably provided between the first connection 21 and the resistance bridges 31, 32, wherein the cathode of the diode 23 faces the resistance bridges 31, 32.

The first switchable resistance bridge 31 has a first switch 33 and a first resistor 34 which are connected in series. The second switchable resistance bridge 32 has a second switch 35 and a second resistor 36 which are connected in series. The switches 33, 35 may preferably be in the form of a MOSFET, a relay or a transistor.

A voltmeter 38 is provided for the purpose of measuring the voltage at the resistance bridges 31, 32 and is connected to the control unit 20 in order to supply a corresponding measurement signal. Since the resistance bridges are connected in parallel, it can be stated that the measuring apparatus 38 is designed to generate a measurement signal 39 characterizing the voltage at the first resistance bridge 31. In the same manner, this corresponds to the voltage at the second resistance bridge or to the voltage at both resistance bridges. The control unit 20 is connected to the first switch 33 and to the second switch 35 in order to make it possible to control these switches 33, 35.

The charging station 52 has, by way of example, a capacitor 54 which is connected between the first connection 21 and the second connection 22, and a resistor 56 and a signal generator 58 are connected in series in parallel with the capacitor 54. A line 60 is connected to the first connection 21 and is used to transmit a voltage signal for the voltage at the first connection 21 in order to make it possible to evaluate the voltage signal.

The communication unit 12 shown may be used, in particular, for a plug type according to the EN 62196 Type 2 standard, which is referred to as IEC Type 2 for short below. The first connection 21 corresponds to the connection CP (Control Pilot) defined there, and the second connection 22 corresponds to the connection PE (protective contact).

If the switch 35 is closed (on), the communication unit 12 behaves like a conventional communication unit for said IEC Type 2 standard, and a charging operation is carried out according to this standard, in a roughly summarized manner, as follows: Before the plug 55 of the charging station 52 is connected to the motor vehicle 10, the signal generator 58 generates a continuous voltage of 12 volts, and PWM clocking is not carried out. The duty cycle DC is therefore 100 percent, the pulse duration therefore corresponds to the period duration of the PWM signal, and a pulse pause does not occur. If the customer inserts the plug 55 of the charging station 52 and therefore connects the charging station 52 to the communication unit 12, the level at the resistance bridges 31, 32 is reduced to 9 volts according to the IEC Type 2 standard, which provides a passive resistance bridge 32 without a switch 35, since the resistor 36 and the resistor 56 act as a voltage divider. This reduction is detected by the charging station 52, and the charging station 52 generates a clocked PWM signal using the signal generator 58, wherein the duty cycle DC indicates what current can be provided by the charging post 52. The communication unit 12 detects that the charging station 52 provides a clocked PWM signal and therefore assumes that the charging station 52 is connected and is ready for the supply of current. The communication unit 12 then turns on the first switch 33, and, as a result, the voltage at the resistance bridges 31, 32 falls to 6 volts with the duty cycle DC predefined by the signal generator 58. This change is detected by the charging station 52 and the latter can turn on the safety contactors—not illustrated—for charging the vehicle and can hereby start the charging operation.

When the second switch 35 is turned on, the communication unit 12 can therefore function like a conventional communication unit for the IEC Type 2 standard.

In addition to the communication unit 12, a charging unit 73 is provided in the vehicle 10 for the charging operation and is connected to a power unit 74 of the charging station 52 via a third connection 71 and a fourth connection 72. The communication unit 12 is connected to the charging unit 73 via a control line 75. During the charging operation, the charging current flows from the charging station 52 to the vehicle 10 via the connections 71, 72. The plug according to the IEC Type 2 standard defines further connections.

According to one embodiment, the first resistor 34 has an electrical resistance of 1.3 kohms and the second resistor 36 has an electrical resistance of 2.74 kohms. According to another embodiment in which a fan is provided, the first resistor 34 has an electrical resistance of 270 ohms and the second resistor 36 has an electrical resistance of 2.74 kohms. Resistors 34, 36 having a minimum accuracy of 3% are preferably used.

Figure 2:
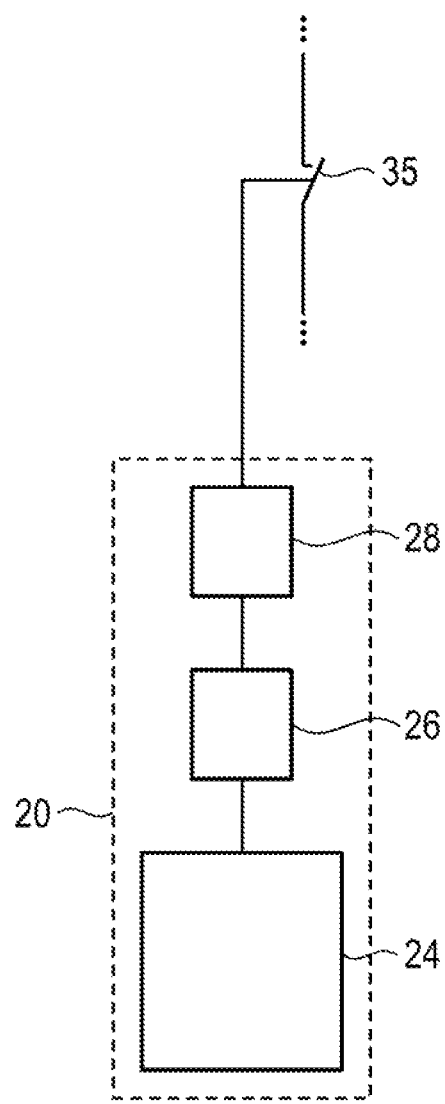
FIG. 2 shows a schematic illustration of control of a switch of the communication unit.

FIG. 2 shows a schematic illustration of the configuration of the control unit 20 for controlling the second switch 35. The control unit 20 preferably has a microcontroller (µC) 24 which is preferably connected to the second switch 35 via control electronics 26 and a filter 28.

The control electronics 26 may be, for example, an operational amplifier or a transistor and are required only when the microcontroller 24 cannot provide a current sufficient to switch the second switch 35 or cannot provide a sufficient voltage. The filter 28 is provided for the purpose of filtering out interference signals in order to prevent unwanted switching of the second switch 35 or to at least reduce the risk since this could result in the charging operation being aborted. The filter 28 is preferably a low-pass filter or an RC element or a second-order low-pass filter.

Figure 3:
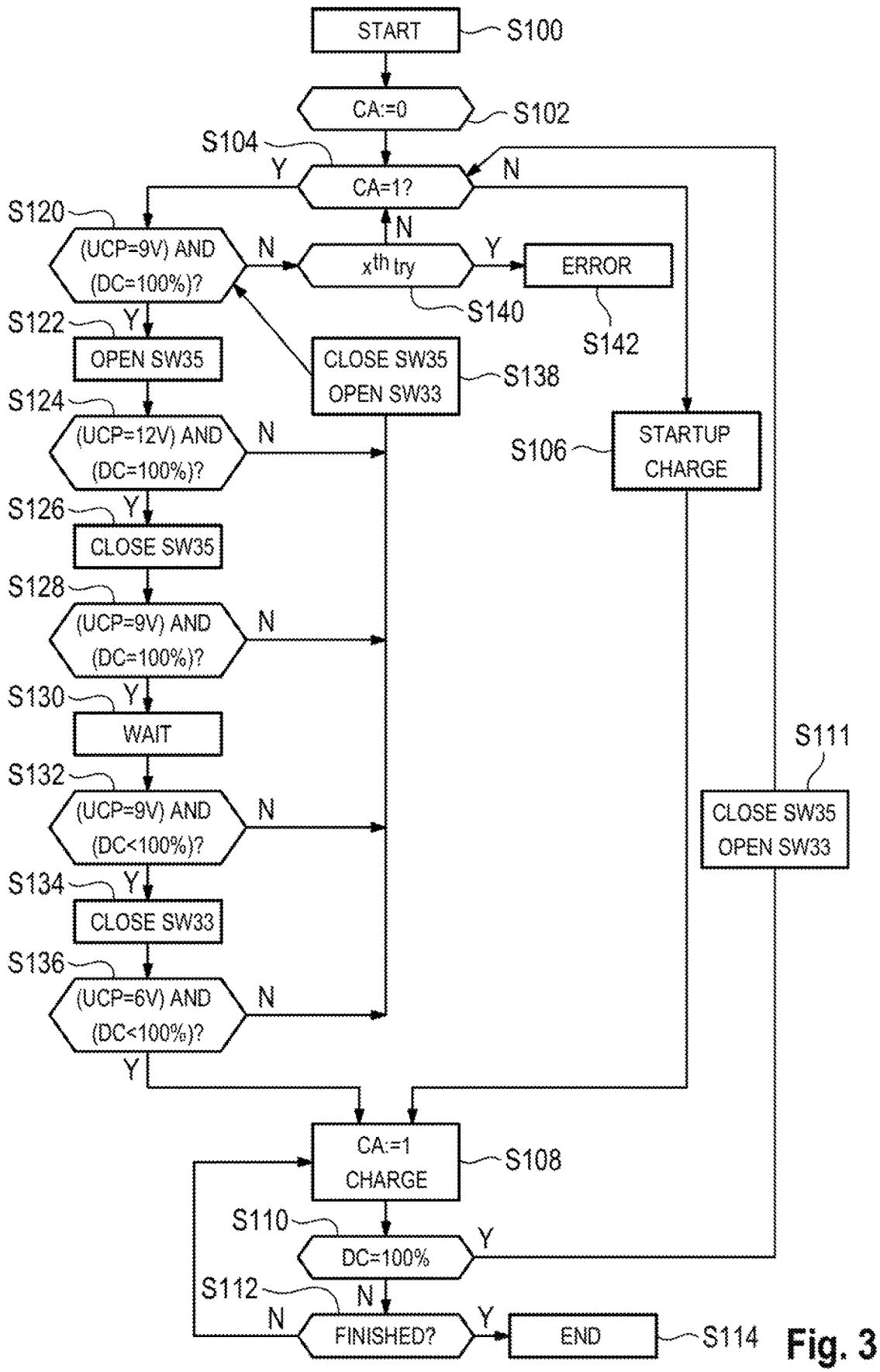
FIG. 3 shows a flowchart of the flow of a program running in the communication unit.

FIG. 3 shows a flowchart of a possible use of the circuit from FIG. 1. The program may run, for example, in the microcontroller 24 from FIG. 2 or may be implemented using an FPGA (Field Programmable Gate Array). In the flowchart, "Y" means yes and "N" means no.

The program begins in step S100 with the start. In step S102, a variable CA is set to the value zero in order to indicate that an active charging operation has not yet been aborted. Step S104 checks whether the variable CA has the value 1. If this is not the case, an active charging operation has not been previously aborted, and the process jumps to S106 to the routine "START UP CHARGE" in which the charging operation as described in FIG. 1 is initiated. The process then jumps to S108 and the variable CA is set to the value 1 there in order to indicate that charging is currently being carried out and the charging "CHARGE" is taking place. This can be referred to as the first state Z1.

During the charging operation in step S108, the process jumps to S110 at intervals of time, and a check is carried out there in order to determine whether the duty cycle DC is currently equal to 100 percent, whether the signal generator 58 from FIG. 1 has therefore completed the clocking and only generates the high voltage. The control unit 20 therefore receives an external abort signal via the first connection 21 and the second connection 22 in the first state Z1, and a second state Z2 occurs as a result.

If such an error or second state Z2 is present, the process jumps to S111 (CLOSE SW35; OPEN SW 33), and the second switch 35 is preferably closed (turned on) and the first switch 33 is opened (turned off). The process then jumps to S104.

If there is no error in S110, the process in contrast jumps to S112 and a check is carried out in the routine "FINISHED?" in order to determine whether the charging operation has been completed. This may be the case, for example, if the rechargeable battery of the vehicle is full or if the user has aborted the charging. If not, the process jumps back to S108 and the charging operation is continued. If the charging operation has been completed, a jump S114 is carried out in contrast and the program is terminated. Alternatively, the variable CA can be set to the value zero again and it is possible to wait for the next charging.

After the charging operation has been completed by the charging station 52 by virtue of the latter continuously generating a high voltage using the signal generator 58, a different branch to S104 is carried out after jumping back from step S110 since the variable CA has the value 1.

After a charging operation has been aborted, many charging post manufacturers require the charging plug 55 to be physically pulled and then inserted again in order to start the charging operation again. This results in no charging taking place until the plug 55 has been pulled by the user and has then been inserted again. In order to increase the robustness of the charging operation, the physical pulling and insertion of the plug 55 are replaced with corresponding control of the second switch 35 in the program part after S120. Opening of the second switch 35 can be detected by the charging station 52 as pulling of the plug 55 since, in both cases, the connection between the connections 21, 22 on the vehicle side has a high impedance. Subsequent closing of the second switch 35 informs the charging station 52 that the plug 55 has been inserted again, that is to say there is a connection between the charging station 52 and the communication unit 12. When the plug 55 is inserted, the pulling of the plug 55 and the subsequent insertion are therefore simulated using the switch 35 by setting the same electrical properties.

S120 checks whether the voltage UCP is equal to 9 V and the duty cycle DC is equal to 100 percent. In this embodiment, both are therefore necessary conditions which must be satisfied. This is the case when the first switch 33 is open (off), the second switch 35 is closed (on) and the signal generator 58 generates a duty cycle DC of 100 percent, that is to say generates a continuously high voltage. For this purpose, the voltage is evaluated via the measuring apparatus 38 and is supplied to the control apparatus 20, cf. FIG. 1. A measurement therefore respectively previously takes place for the comparisons in the flowchart, in which case this is not respectively carried out in an additional step for reasons of clarity. The check in order to determine whether the voltage UCP corresponds to 9 volts is expressed in a simplified manner. The program usually tests whether the voltage is within a permissible range, for example between 8 V and 10 V or between 8.5 V and 9.5 V. The voltage UCP should therefore correspond to a value which occurs in a corresponding state of the switches 33 and 35 and in the case of corresponding signal generation by the signal generator 58, taking into account the maximum tolerances of the components. The same applies to the other voltage values stated below.

If the check in S120 has a positive result, the process jumps to S122, and the second switch 35 is opened or turned off in the routine "OPEN SW35". When the plug 55 is inserted, this signals to the charging station 52 that the plug 55 has been pulled, that is to say there is no connection via the connections 21, 22.

S124 then preferably checks whether the voltage UCP has risen to 12 volts and the duty cycle DC is still 100 percent. If this is the case, the process jumps to S126, and the second switch 35 is closed again or turned on in the routine "CLOSE SW35". This signals to the charging station 52 that the plug is inserted "again".

S128 then preferably checks whether the voltage UCP has fallen to 9 volts again as a result of the second switch SW35 being closed and whether the duty cycle DC of the signal generator 58 is still 100 percent. If this is the case, waiting is carried out in S130 in the routine "WAIT". Waiting is either carried out for a predefined period or a check is carried out for a predefined maximum period in order to determine whether the state of the signal generator 58 changes. S132 checks whether the signal generator 58 generates a clocked PWM signal, in order to thus indicate that the charging station 52 has detected that the plug 55 has been inserted, and uses the PWM signal to disclose which charging currents are possible. If this is the case, the first switch 33 is closed in S134 in the routine "CLOSE SW33" and S136 then checks whether the voltage UCP has fallen to 6 volts and a clocked PWM signal is still generated by the signal generator 58.

If this is the case, the process jumps to S108 and the charging operation takes place as described above.

If the check in S120 was negative, that is to say if the charging station 52 does not continuously provide a voltage or the plug 55 is not connected correctly, the process jumps to S140 where a check is carried out in order to determine whether a predefined number of attempts have already been carried out without success. If this is not the case, the process jumps to S104. If a predefined number of attempts have already been carried out without success, the process jumps to S142 and an error signal is generated. The error signal "ERROR" can be stored in the communication unit 12 and/or can be output to the charging station 52 so that the latter can display the error, for example using a display. A counter, for example, can be used for the check in S140, which counter is respectively incremented after an unsuccessful attempt in S120 and is respectively reset in steps S102 and S111, for example.

If the check in step S124, S128, S132 or S136 has led to a negative result, the process preferably respectively jumps to S138 where the second switch 35 is closed (turned on) and the first switch 33 is opened (turned off) if this was not already respectively the case. If the switches 35 and 33 therefore already have the corresponding state, there is no need to switch to the desired state again. The process then jumps back to S120.

The checks of the voltage and of the duty cycle listed in the flowchart in steps S120, S124, S128, S132 and S136 result in good error detection and operational reliability. However, they are not absolutely necessary for operation and can be entirely or partially omitted.

Figure 4:
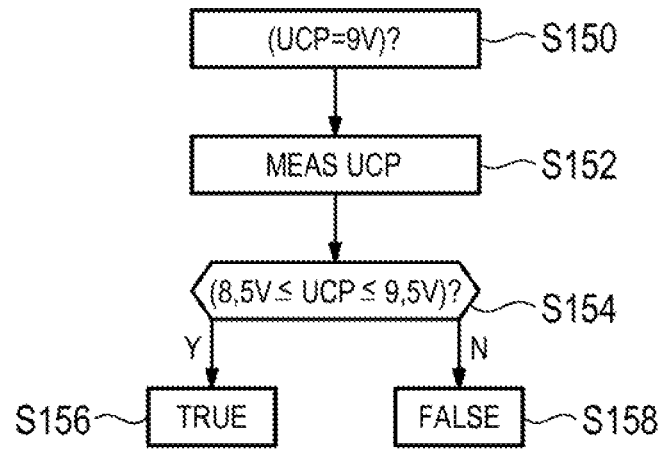
FIG. 4 shows a flowchart for evaluating a measurement signal.

FIG. 4 shows an exemplary embodiment of evaluation of the measurement signal 39 from FIG. 1 for the purpose of determining the magnitude of the measurement signal 39. For example, the intention is to check whether the measurement signal has a voltage of 9 volts or corresponds to such a voltage. Such a check is carried out for different voltages, for example in steps S120, S124, S128, S132 and S136.

S150 denotes the routine which is intended to check whether the voltage UCP corresponds to the value of 9 volts. A measurement is carried out in S152 and the measurement signal 39 is evaluated for this purpose. The measurement signal 39 may be, for example, in the form of an analog voltage which is optionally transformed into a suitable voltage range via a voltage divider, or the measurement signal 39 can be supplied to the control unit 20 in the form of digital measured values. S154 then checks whether the value UCP is between 8.5 volts and 9.5 volts. If the values are possibly transformed by means of a voltage divider or if an A/D conversion is carried out, values corresponding to these voltages are used instead of the values of 8.5 volts and 9.5 volts. If the condition is true, the process jumps to S156 and the result is positive (TRUE), that is to say the condition has been satisfied. If not, the process jumps to S158 and the result is negative (FALSE). The suitable size of the range which is checked in S154 is dependent, in particular, on the maximum tolerances of the components and of the signal generator 58 in the charging station 52.

Figure 5:
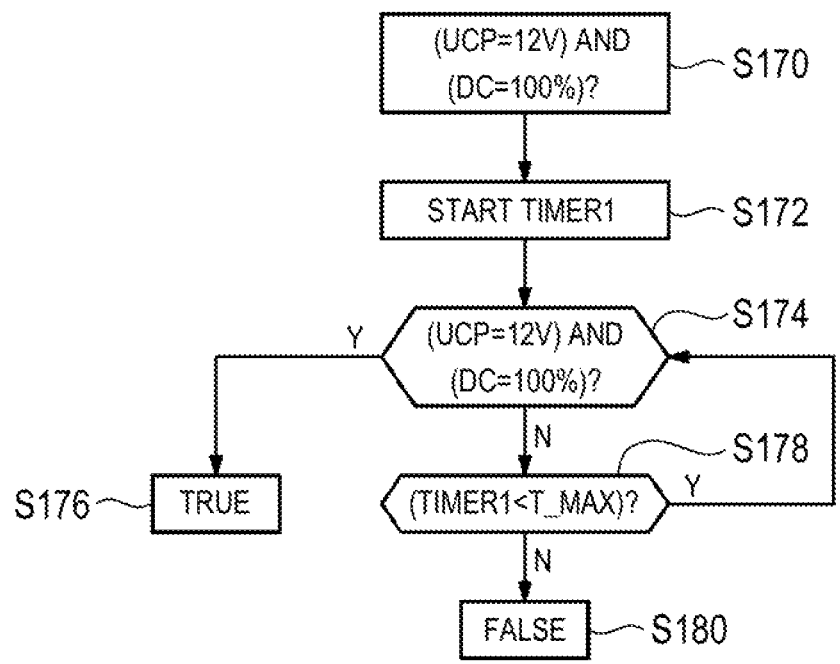
FIG. 5 shows a flowchart for evaluating a measurement signal with handling of an error.

FIG. 5 shows a more error-tolerant variant of step S124 from FIG. 3 and can replace this step. The flowchart begins in step S170. A timer TIMER1 is started in S172 ("START TIMER1"). S174 checks whether the measurement signal UCP corresponds to a value of 12 volts and whether the duty cycle DC of the PWM signal is 100 percent. If YES, these necessary conditions have been satisfied and the process jumps to step S176 which is denoted "TRUE" and indicates that the conditions have been satisfied and the process can be continued. If at least one of the necessary conditions from S174 has not been satisfied, the process jumps to S178 and a check is carried out in order to determine whether the value of the timer TIMER1 is less than a predefined maximum period T_MAX. If this is the case and if the maximum period has not yet expired, the process jumps back to S174. If NO, the process jumps to S180 and the result is negative ("FALSE"). The process would then jump to step S138 in the flowchart from FIG. 3.

As an alternative to the loop having steps S174 and S178, it is possible to wait for a predefined period before S124 in FIG. 3 and the check can only then be carried out. However, this possibly results in a slower program flow.

Various variations and modifications are naturally possible within the scope of the present invention.

What is claimed is:

1. A communication unit for a vehicle, the communication unit comprising:
   a control unit, a first switchable resistance bridge, a second switchable resistance bridge and a measuring apparatus for generating a measurement signal characterizing a voltage at the first switchable resistance bridge,
   wherein the first switchable resistance bridge and the second switchable resistance bridge are connected in parallel with one another,
   wherein the first switchable resistance bridge has a first switch and a first resistor, wherein the second switchable resistance bridge as a second switch and a second resistor,
   wherein the control unit has at least one first state and one second state, wherein the first state corresponds to an active charging operation, and the second state occurs when the control unit in the first state receives an external abort signal,
   wherein the control unit is configured to carry out the following steps in the event of a change to the second state:
   a) turn off the first switch if the first switch is on,
   b) turn off the second switch, and
   c) turn on the second switch again after step b), and
   wherein the control unit is configured to monitor the measurement signal after step b) and, as a necessary condition for the change to step c), to check whether a magnitude of the measurement signal is within a predefined first range.

2. The communication unit as claimed in claim 1, in which the control unit has a filter in order to control the second switch.

3. The communication unit as claimed in claim 1, in which the control unit has a microcontroller, which microcontroller is configured to control the second switch.

4. The communication unit as claimed in claim 1, the communication unit being configured to evaluate the measurement signal in the first state and to classify a change in a duty cycle to 100% as an external abort signal.

5. The communication unit as claimed in claim 1, in which the control unit is configured to carry out the following step between steps b) and c):
   b1) wait for a predefined period.

6. The communication unit as claimed in claim 1, in which the control unit is configured to monitor the measurement signal after step b) and, as a necessary condition for the change to step c), to check whether the measurement signal has a duty cycle of 100%.

7. The communication unit as claimed in claim 1, in which the control unit is configured to check the period after step b) and, when the at least one necessary condition has not been satisfied within a predefined maximum period (T_MAX), to turn off the first switch and to turn on the second switch and to then change to step a) again.

8. The communication unit as claimed in claim 7, in which the control unit is configured to output an error after a predefined number of renewed changes to step a).

9. The communication unit as claimed in claim 1, in which the control unit is configured to carry out the following steps after step c):
   d) turn on the first switch, and
   e) start the charging operation.

10. The communication unit as claimed in claim 9, in which the control unit is configured to monitor the measurement signal after step d) and, as a necessary condition for the change to step e), to check whether a magnitude of the measurement signal for a pulse is within a predefined second range.

11. The communication unit as claimed in claim 7, in which the control unit is configured to monitor the measurement signal after step d) and, as a necessary condition for the change to step e), to check whether a duty cycle of the measurement signal is less than 100%.

12. The communication unit as claimed in claim 1, in which the second switch is in the form of a MOSFET, a relay or a transistor.

* * * * *